J. ORTIZ.
FLOATING FORTRESS.
APPLICATION FILED APR. 7, 1917.

1,350,667.

Patented Aug. 24, 1920.
3 SHEETS—SHEET 1.

WITNESS:

INVENTOR
Julien Ortiz
BY
ATTORNEY.

J. ORTIZ.
FLOATING FORTRESS.
APPLICATION FILED APR. 7, 1917.

1,350,667.

Patented Aug. 24, 1920.
3 SHEETS—SHEET 2.

WITNESS:

INVENTOR
Julien Ortiz
BY
ATTORNEY.

J. ORTIZ.
FLOATING FORTRESS.
APPLICATION FILED APR. 7, 1917.

1,350,667.

Patented Aug. 24, 1920.
3 SHEETS—SHEET 3.

WITNESS:

INVENTOR
Julien Ortiz
BY
Frank S. Busser
ATTORNEY.

UNITED STATES PATENT OFFICE.

JULIEN ORTIZ, OF GREENVILLE, DELAWARE.

FLOATING FORTRESS.

1,350,667.  Specification of Letters Patent.  Patented Aug. 24, 1920.

Application filed April 7, 1917. Serial No. 160,345.

*To all whom it may concern:*

Be it known that I, JULIEN ORTIZ, a citizen of France, residing at Greenville, county of New Castle and State of Delaware, have invented a new and useful Improvement in Floating Fortresses, of which the following is a full, clear, and exact description, reference being had to the accompanying drawings, which form a part of this specification.

My invention relates to a form of armed float for use at sea as a means of national defense. The object of my invention is to produce such a floating fortress, a number of which may be anchored at various strategic points along the coast or across a channel or anywhere desired, for the purpose of acting as naval sentinels to guard against the approach of enemy sea craft, and to so construct the same that its main body or hull may be submerged.

My invention consists of a craft having the general form of the cross-section of a ship. The hull is capable of being sealed water-tight and the entire fortress submerged if the occasion arises, in which case a periscope provides means for maintaining an outlook above the level of the water.

Many such floating fortresses can be built for the cost of a single man of war, and their utility and manifold advantages will be readily understood and appreciated from the following description in connection with the accompanying drawings, in which:—

The hull $a$ of the fortress is, as stated above, of general circular cross-section. The deck $b$ is entirely closed except in its center where a large tube $c$ emerges for some distance above the deck with a water-tight hinged door at its top.

A platform $d$ is supported above the hull by structural supports $e$, and a ladder $f$ affords access thereto. Above this platform arises a periscope $g$, the top of which is supported by guys from outriggers $h$ from the platform. Wireless antennæ $i$ may also be mounted thereon.

Figure 4:
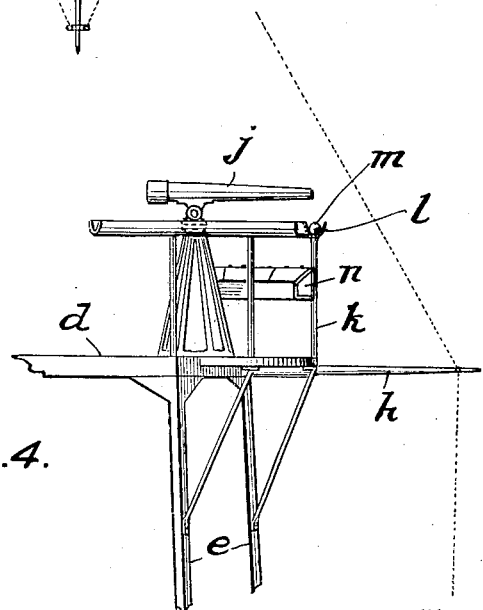
Fig. 4 is a fragmentary view showing details of construction.

Two rapid fire guns $j$ are mounted on the platform $d$ which may also be provided with railings $k$ such as I have illustrated for the platform in Fig. 4. I have here shown the hand rail in the form of a groove or trough $l$, in which may be placed shells $m$ convenient to the gunner in time of action. The rail stanchions may also carry a long inclosed shelf or box $n$, with hinged lids, for conveniently carrying the charges for the guns. The upper deck $b$ is provided with four machine guns $j$ protected, when in use, with hinged shields not shown.

Access to the interior of the hull $a$ is had by means of ladders $o$ leading through the central tube $c$. In case the decks become untenable by reason of the force of the sea or storm or enemy attack, the crew may seek safety within the hull. For these occasions periscopes $p$ are placed at three or more points around the central tube for the purpose of enabling observation to be had of what is occurring on all sides of the fortress.

Within the hull are arranged torpedo tubes $q$ just below the water level at the normal position of the fortress. A lower deck $r$ is arranged convenient for handling the torpedoes, and forming an upper compartment, access to which is had through a doorway in the side of the central tube.

Ladders $o$ continue down through deck $r$ into the central compartment of the hull, in which is arranged various apparatus which I will now describe.

Figure 1:
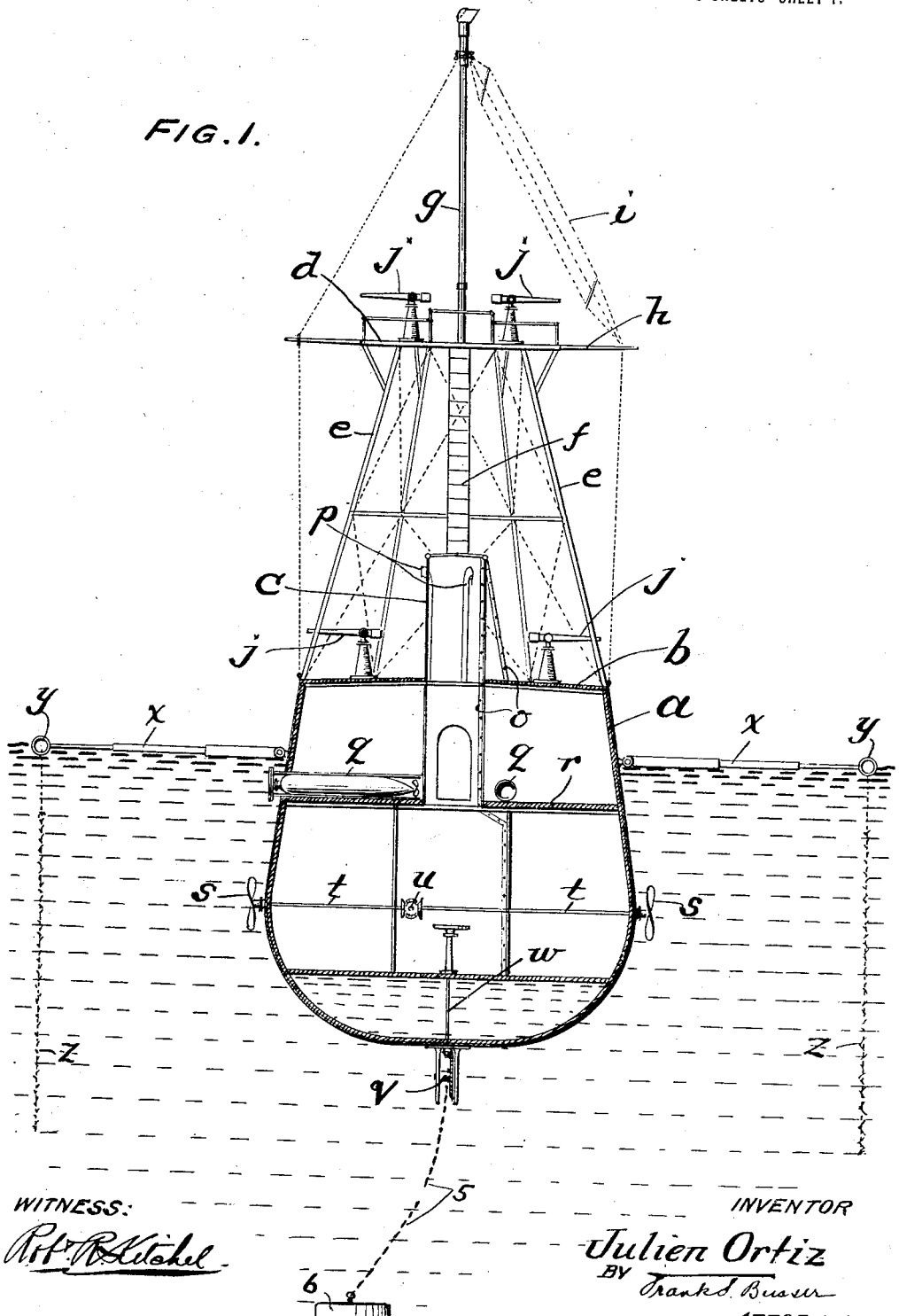
Figure 1 is an elevational view of an embodiment of my invention shown in section.
Figure 2:
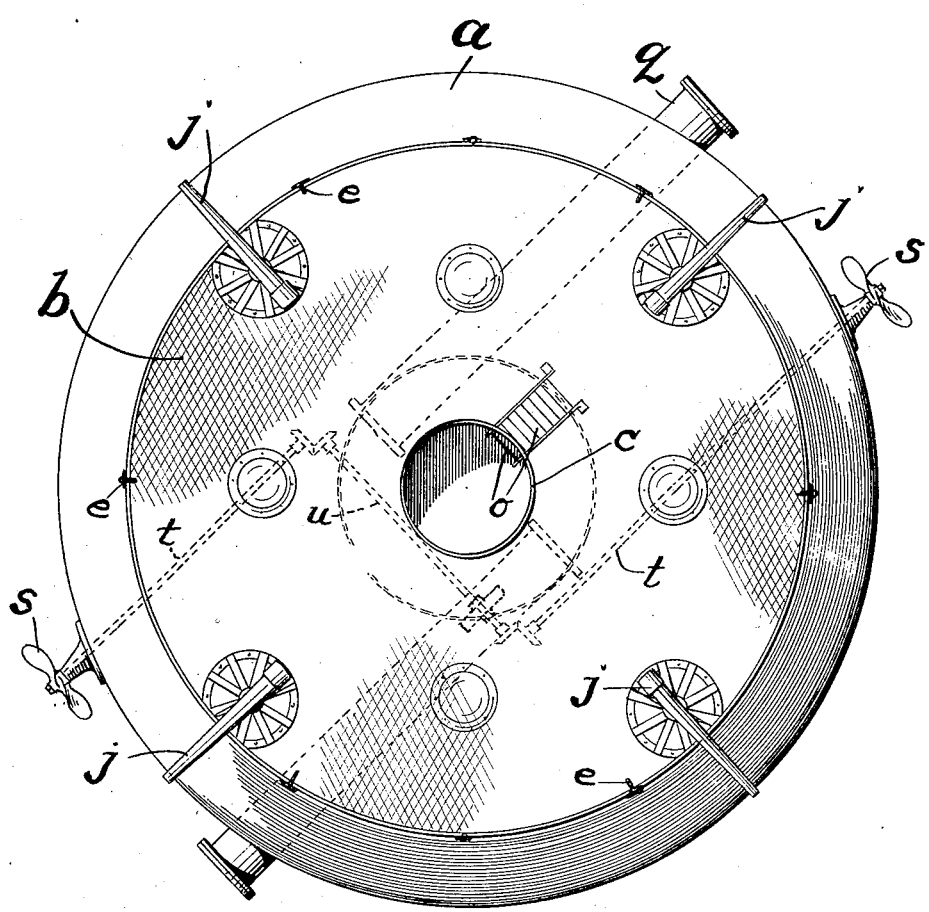
Fig. 2 is an enlarged plan view of the main deck.
Figure 3:
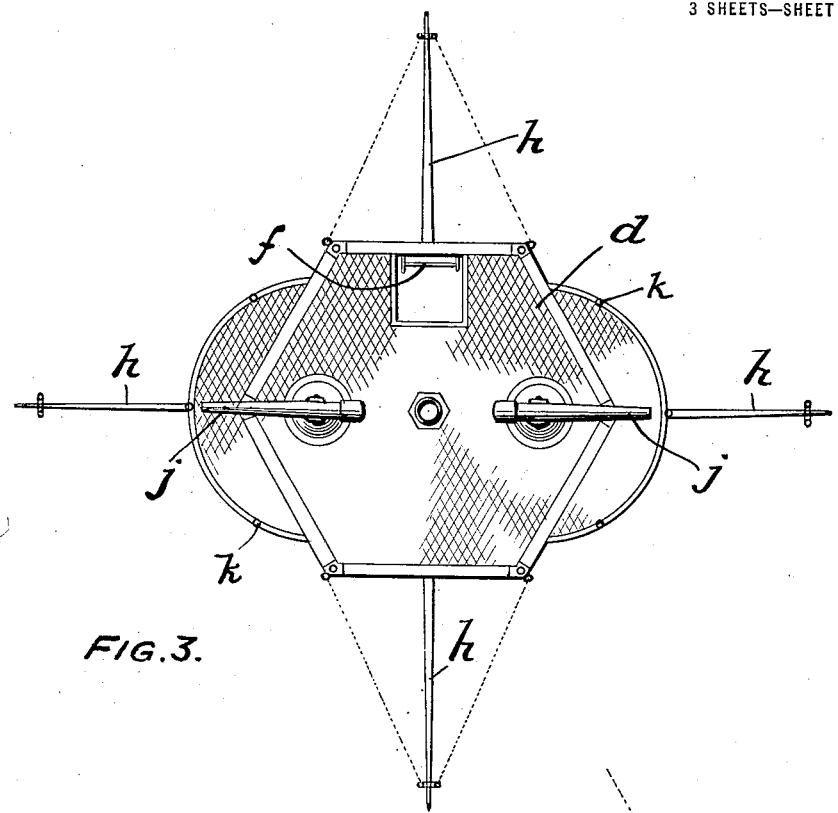
Fig. 3 is a similar plan view of the upper deck.

Two propellers $s$, on opposite sides of the hull, are arranged as shown in Fig. 2, with their axes parallel but offset on opposite sides of a diameter of the hull. Thus, by operating these propellers the fortress may be turned around in the water to present the torpedo tubes in a given direction or for any other reasons. I have shown the shafts $t$ of these propellers as interconnected by a cross shaft $u$, which is given motion from a motor carried in the central compartment, but not illustrated, as it forms no part of my invention. It is understood that this motor operates any ammunition hoists, air and water pumps, etc. which would be required, but which it is unnecessary herein to describe, the same being common in present day ships and submarines.

For submerging the fortress there is a drum $v$ secured beneath the hull, from which a cable 5 leads to an anchor or weight 6 at the bottom of the sea. By means of gearing and a shaft *w* leading through a stuffing box in the bottom of the hull, drum *v* may be turned to wind up the chain and thus drag the entire fortress beneath the level of the sea. If found necessary, shaft *w* may be given motion from the above mentioned motor instead of from the hand wheel as shown. To facilitate submergence additional water may be introduced into the lower compartment, which is pumped out when returning afloat.

Radiating from the outside of the hull at various points are struts *x* hinged to the hull, at the normal water level, the outer ends of which are buoyed up by means of suitable floats *y*, and carry a steel torpedo net *z*, of a depth to effectively protect the body of the hull. The struts are composed of telescoping sections so that, as the hull is submerged, the struts lengthen out and the normal position of the floats and the shape of the net remain undisturbed.

Having now fully described my invention, what I desire to claim and protect by Letters Patent is:—

1. A floating fortress comprising a hull, struts having telescopic connections, floats carried by the struts, and nets depending from the floats, the struts being hinged to the hull to swing in a vertical plane.

2. A floating fortress comprising a hull, floats, nets depending from the floats and surrounding the hull, and means to submerge the hull, the struts being hinged to the hull to swing in a vertical plane composed of telescoping sections to permit of their extensibility, whereby the hull may float or submerge without disturbance of the protecting nets.

In testimony of which invention, I have hereunto set my hand, at Greenville, Delaware, this third day of April, 1917.

JULIEN ORTIZ.